United States Patent
Wang

(10) Patent No.: US 8,225,635 B2
(45) Date of Patent: Jul. 24, 2012

(54) METHOD FOR MAKING BICYCLE PEDAL

(76) Inventor: Lopin Wang, Taichung (TW)

( * ) Notice: Subject to any disclaimer, the term of this patent is extended or adjusted under 35 U.S.C. 154(b) by 185 days.

(21) Appl. No.: 12/796,679

(22) Filed: Jun. 9, 2010

(65) Prior Publication Data

US 2010/0313623 A1    Dec. 16, 2010

(30) Foreign Application Priority Data

Jun. 10, 2009    (CN) .......................... 2009 1 0112029

(51) Int. Cl.
*B21D 31/00* (2006.01)
(52) U.S. Cl. ........................................... 72/37; 72/379.2
(58) Field of Classification Search ......... 72/37, 379.24, 72/379.2
See application file for complete search history.

(56) References Cited

U.S. PATENT DOCUMENTS

| | | | | |
|---|---|---|---|---|
| 2,567,785 A * | 9/1951 | Rieger | ............................. | 29/437 |
| 4,033,199 A * | 7/1977 | Bouder | ........................ | 74/594.6 |
| 6,739,387 B1 * | 5/2004 | Ren | ................................ | 165/176 |
| 6,851,189 B2 * | 2/2005 | Hermansen et al. | ......... | 29/897.2 |
| 2002/0170382 A1 * | 11/2002 | Yang | ........................... | 74/594.6 |

* cited by examiner

Primary Examiner — Bena Miller
(74) Attorney, Agent, or Firm — Leong C. Lei

(57) ABSTRACT

Disclosed is a method for making a bicycle pedal, comprising the following steps: (A) cutting, in which an elongate metal plate is formed by pressing and two coupling holes are formed through the plate; (B) bending, in which the metal plate is bent to have the opposite ends jointed to each other, forming a circumferentially enclosed hollow pedal frame with the two coupling holes concentrically located and spaced from and opposing each other; and (C) welding, in which a collar is mounted outside the pedal frame concentric with respect to each of the coupling holes through welding to provide a sufficient contact area for rotatably receiving and supporting a spindle therein, whereby the pedal frame is rotatable about the spindle for pedaling operation of a bicycle. This method overcomes the various drawbacks occurring in metal-cast or plastic injection-molded bicycle pedals, providing economic advantages for high-mix low-volume productions.

1 Claim, 4 Drawing Sheets

METHOD FOR MAKING BICYCLE PEDAL

TECHNICAL FIELD OF THE INVENTION

The present invention generally relates to a method for making bicycle pedal, which overcomes various drawbacks occurring in the conventional metal-cast bicycle pedals or plastic injection-molded bicycle pedals.

DESCRIPTION OF THE PRIOR ART

Heretofore, most of the bicycles comprise pedals that are made of aluminum through die casting to form an integrally formed pedal frame and spindle tube extending across the pedal frame. And then, an elaborate and complicated machining operation is applied to form a central bore axially extending through a center of the spindle tube. The bore rotatably receives and supports a spindle therein. The spindle has an end mounted to a crank for pedaling of the bicycle. However, die casting has disadvantages, some of which are listed as follows.

(1) The die casting process is subjected to limitation in selection of materials and currently, only six metals can be used, including zinc, tin, lead, copper, magnesium, and aluminum.

(2) The facility costs are high for the die casting process must be carried out through numerous equipments, including casting machine, melting oven, temperature keeping oven, and casting dies, which are all expensive devices and thus the process is only fit for mass production.

(3) The casting parts are of poor air-tightness, for metal melts are filled into the die with a high speed, which often leads to turbulences, forming localized air pores or shrunk cavities, which affects air-tightness, so that the spindle tube of a bicycle pedal so made is susceptible to invasion of humidity, leading to corrosion and rusting of the spindle.

To address such a problem, some of the manufacturers use injection molding of plastics to form an integrally formed combination of spindle tube and pedal frame. This helps reducing costs, but the structural strength of the plastic molded pedal is poor, and the pedal is susceptible to breaking due to unexpected impacts or hits, leading to shortened service life or even poor safety of operation. It is for such reasons that the plastic molded pedal is rarely seen in the market.

Due the fact that both the metal-cast pedal and the plastic-molded pedal are of severe problems, the present invention aims to provide a method for making bicycle pedal that overcomes the drawbacks of the conventional methods for making bicycle pedals.

SUMMARY OF THE INVENTION

The primary objective of the present invention is to provide a method for making bicycle pedal, which comprises processes for forming pedal frame and mounting collars for overcoming various drawbacks occurring in metal-cast bicycle pedals and plastic injection-molded bicycle pedals so as to provide an economic advantage in the current market demand of high-mix low-volume productions.

To achieve the above objective, the present invention provides the following solution.

In an aspect of the present invention, a method for making a bicycle pedal comprises the following steps: (A) cutting, in which an elongate metal plate is formed by pressing and two coupling holes are formed through the plate; (B) bending, in which the metal plate is bent to have the opposite ends jointed to each other, forming a circumferentially enclosed hollow pedal frame with the two coupling holes concentrically located and spaced from and opposing each other; and (C) welding, in which a collar is mounted outside the pedal frame concentric with respect to each of the coupling holes through welding to provide a sufficient contact area for rotatably receiving and supporting a spindle therein, whereby the pedal frame is rotatable about the spindle for pedaling operation of a bicycle.

In step (A) of the above discussed method, the metal plate has a central portion in which a coupling hole is defined and opposite ends which respectively form mated halves of another coupling hole.

In step (A) of the above discussed method, the metal plate has opposite edges forming serrated pawls.

In the above discussed method, a step (D) of assembling operation is further performed after step (C).

In step (D) of the above discussed method, a plastic sleeve is set within a bore of each of the collars and an outer tube is set to bridge and connect between the two coupling holes with opposite ends of the outer tube constrained by the two sleeves, the outer tube and the sleeves forming respectively centrally penetrating bores so that the bores of the sleeves receive therein bearings and sealing ring with a spindle rotatably received in and extending through the bearings, wherein an end of the spindle is mounted to a crank and an opposite end forms an externally-threaded section for being tightened by a nut, and the sleeve associated with the opposite end of the spindle is closed by a cap, whereby the nut provides a tightening force that securely fixes the sleeves, the outer tube, the bearings, and the spindle together to allow the pedal frame to be rotatable about the spindle.

In another aspect of the present invention, a method for making a bicycle pedal comprises the following steps: (A) cutting, in which a rolled metal tube or an aluminum extruded tube is selected and cut to form a hollow pedal frame; (B) drilling, in which the pedal frame is machined to form penetrating coupling holes; and (C) welding, in which a collar is mounted outside the pedal frame concentric with respect to each of the coupling holes through welding to provide a sufficient contact area for rotatably receiving and supporting a spindle therein, whereby the pedal frame is rotatable about the spindle for pedaling operation of a bicycle.

In the above discussed method, a step (D) of assembling operation is further performed after step (C).

In step (D) of the above discussed method, a plastic sleeve is set within a bore of each of the collars and an outer tube is set to bridge and connect between the two coupling holes with opposite ends of the outer tube constrained by the two sleeves, the outer tube and the sleeves forming respectively centrally penetrating bores so that the bores of the sleeves receive therein bearings and sealing ring with a spindle rotatably received in and extending through the bearings, wherein an end of the spindle is adapted to mount to a crank and an opposite end forms an externally-threaded section for being tightened by a nut, and the sleeve associated with the opposite end of the spindle is closed by a cap, whereby the nut provides a tightening force that securely fixes the sleeves, the outer tube, the bearings, and the spindle together to allow the pedal frame to be rotatable about the spindle.

With the above discussed structural arrangement, the present invention provides a hollow pedal frame that is formed through cold bending operation, with collars mounted thereto through welding, so as to provide a sufficient contact area for rotatably supporting a spindle therein. This method uses the specific process to form the pedal frame and the collars attached thereto so as to overcome various drawbacks occurring in the conventional metal-cast bicycle pedals or plastic injection-molded bicycle pedals and thus provide an economic advantage in the current market demand of high-mix low-volume productions. Further, the present invention may alternatively uses a rolled metal tube or an aluminum extruded tube as a starting blank, which is cut to form a hollow pedal frame and the pedal frame is subjected to drilling operations to form penetrating coupling holes. Then, collars are respectively mounted to the pedal frame outside the coupling holes through welding. This alternative form of the method according to the present invention is also effective in removing the drawbacks of the conventional ways.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
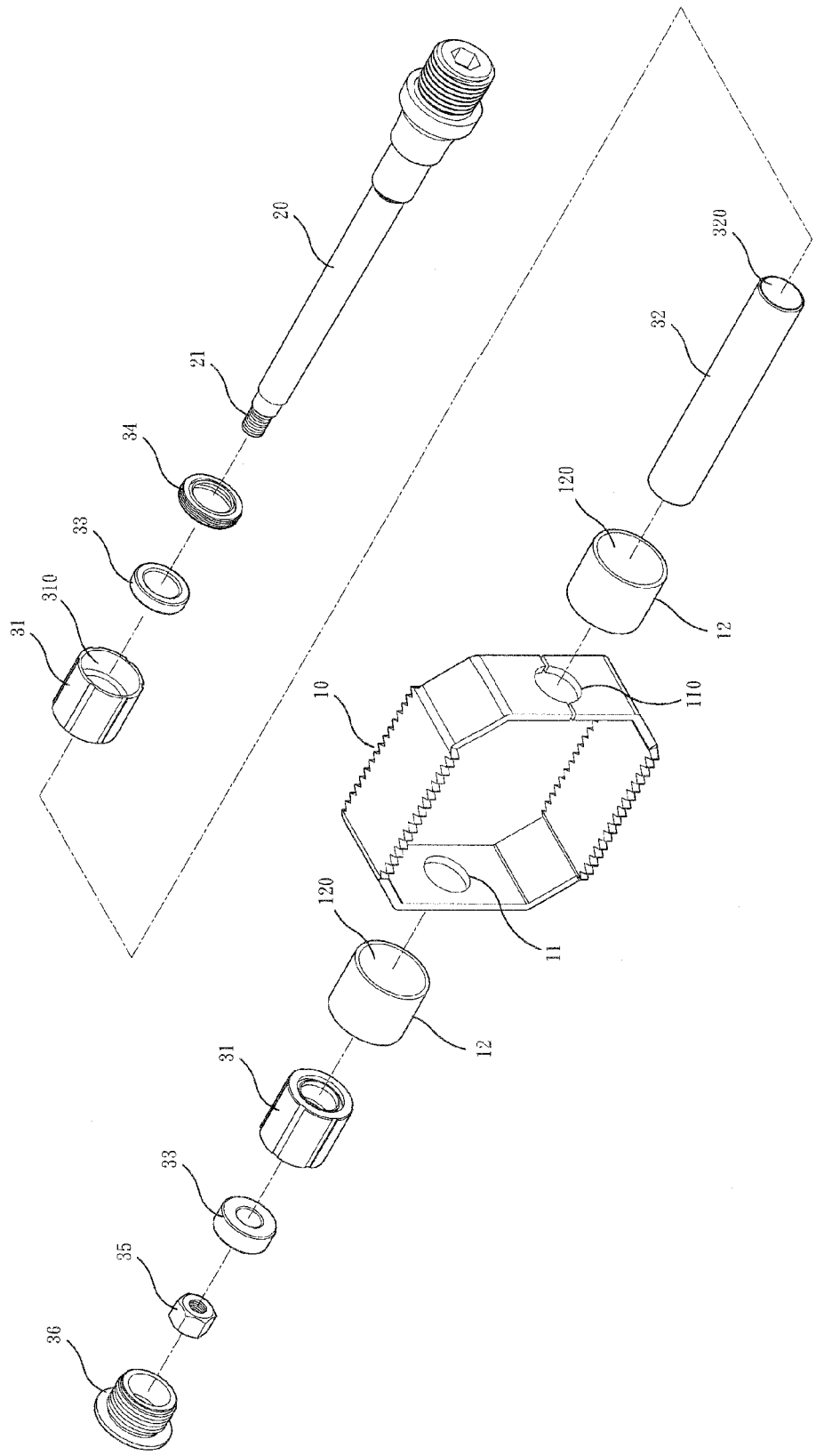
FIG. 1 is an exploded view showing a bicycle pedal made with a method according to the present invention.
Figure 2:
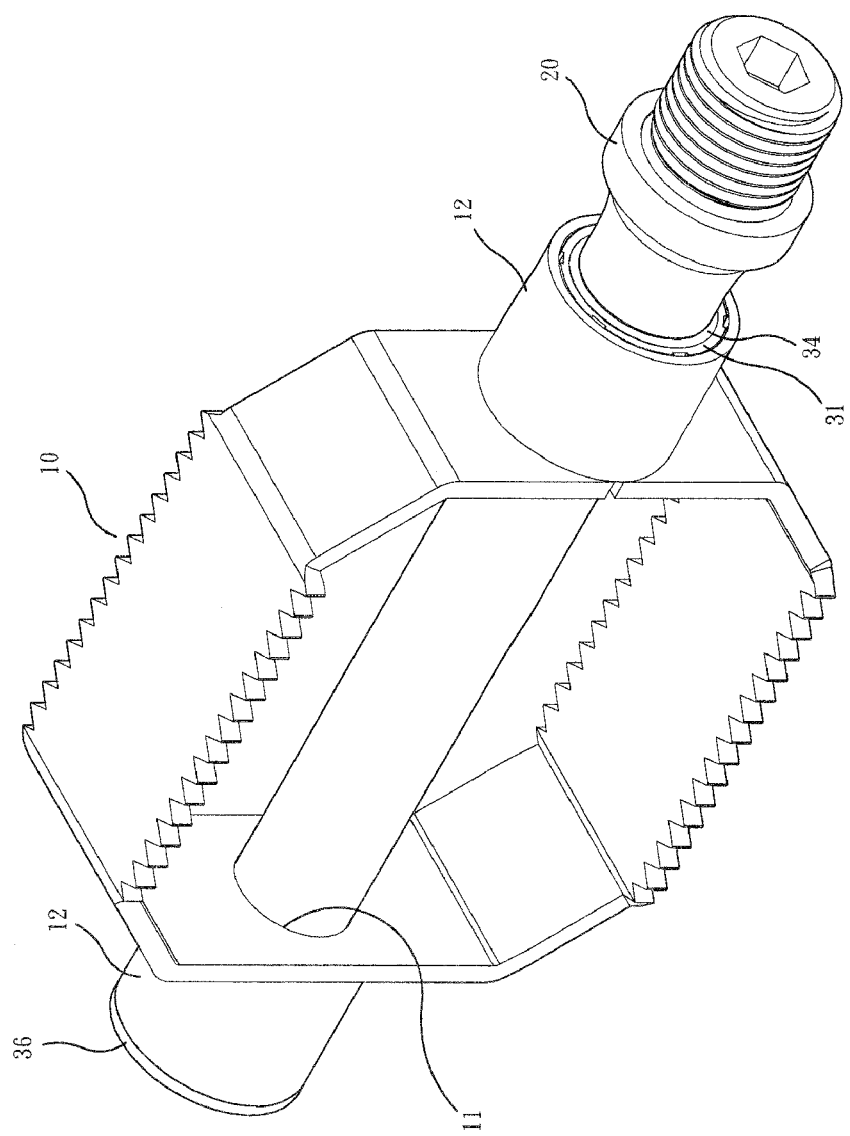
FIG. 2 is an assembled view of the bicycle pedal made with the method according to the present invention.
Figure 3:
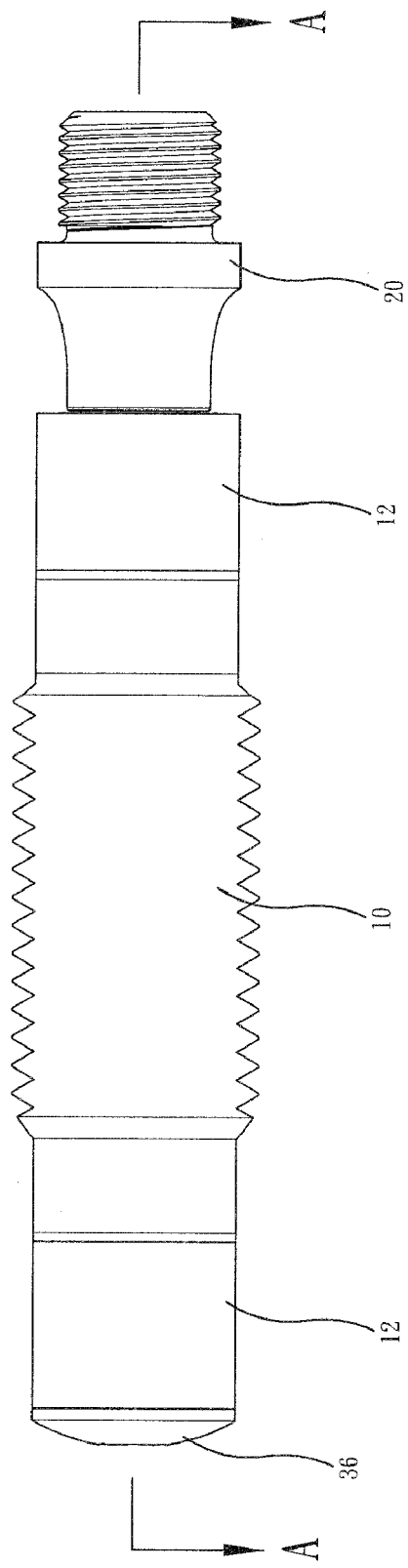
FIG. 3 is a side elevational view of the bicycle pedal made with the method according to the present invention.
Figure 4:
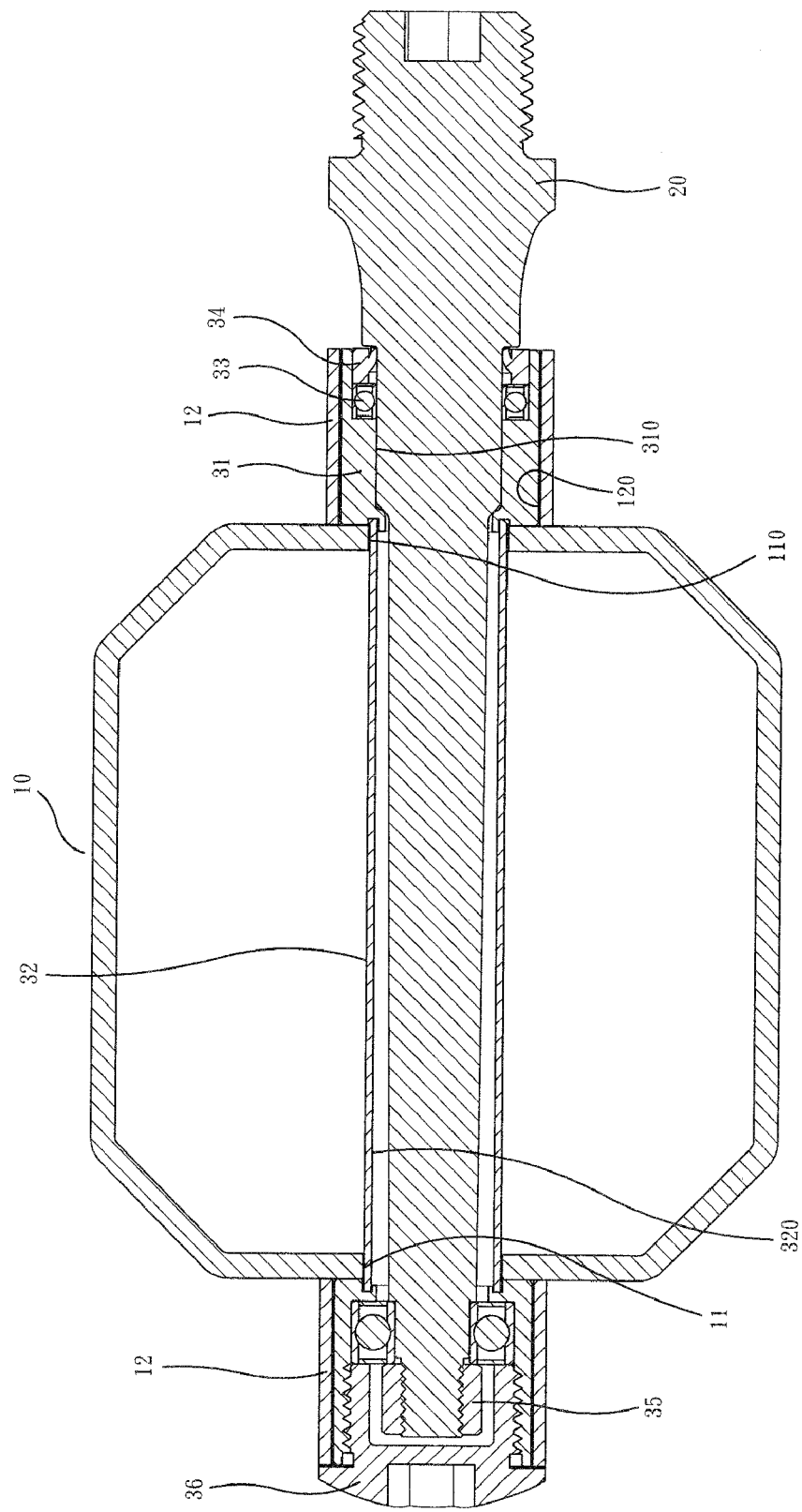
FIG. 4 is a cross-sectional view taken along line A-A of FIG. 3.

Referring to FIGS. 1-4, the present invention provides a method for making a bicycle pedal, which comprises the following steps:

(A) Cutting, in which a press is used to stamp out an elongate metal plate, which has opposite edges forming serrated pawls, a central portion in which a coupling hole 11 is formed, and opposite ends which respectively form mated halves of an additional coupling hole 110;

(B) Bending, in which the metal plate is bent to have the opposite ends jointed to each other, forming a circumferentially enclosed hollow pedal frame 10 with the coupling holes 110 concentrically located and spaced from and opposing each other;

(C) Welding, in which a collar 12 is mounted outside the pedal frame 10 concentric with respect to each of the coupling holes 11, 110 through welding; and (D) Assembling, in which a plastic sleeve 31 is set within a bore 120 of each collar 12 and an outer tube 32 is set to bridge and connect between the two coupling holes 11, 110 with opposite ends of the outer tube 32 constrained by the two sleeves 31, and the outer tube 32 and the sleeves 31 form respectively centrally penetrating bores 320, 310 so that the bores 310 receive therein bearings 33 and one or more sealing rings 34 with a spindle 20 rotatably received in and extending through the bearings 33, wherein an end of the spindle 20 is mounted to a crank and an opposite end forms an externally-threaded section 21 for being tightened by a nut 35, and the sleeve 31 associated with the opposite end of the spindle 20 is closed by a cap 36, whereby the nut 35 provides a tightening force that securely fixes the sleeves 31, the outer tube 32, the bearings 33, and the spindle 20 together to allow the pedal frame 10 to freely rotate about the spindle 20 for pedaling operation of the bicycle.

From the above description, it is appreciated that the present invention offers at least the following advantages:

(1) The material used in the present invention can be made of any type of metal, making the selection of material less constrained;

(2) Facility costs required by the present invention is much lower than die casting, making it applicable to high-mix low-volume productions, and no deep hole machining is needed, making it effective in increasing economic performance;

(3) The present invention adopts cold bending operation, making the product thereof excellent in air-tightness, which helps minimizing corrosion and rusting of the spindle; and (4) The present invention provides a pedal frame that is made of metal, making the overall strength better than plastic injection moldings.

Further, the present invention provides a method for making a bicycle pedal, which comprises the following steps:

(A) Cutting, in which a rolled metal tube or an aluminum extruded tube is selected and cut to form a hollow pedal frame 10;

(B) Drilling, in which a hole drilling operation is performed on the pedal frame 10 to form penetrating coupling holes 11, 110;

(C) Welding, in which a collar 12 is mounted outside the pedal frame 10 concentric with respect to each of the coupling holes 11, 110 through welding; and (D) Assembling, in which a plastic sleeve 31 is set within a bore 120 of each collar 12 and an outer tube 32 is set to bridge and connect between the two coupling holes 11, 110 with opposite ends of the outer tube 32 constrained by the two sleeves 31, and the outer tube 32 and the sleeves 31 form respectively centrally penetrating bores 320, 310 so that the bores 310 of the sleeves receive therein bearings 33 and one or more sealing rings 34 with a spindle 20 rotatably received in and extending through the bearings 33, wherein an end of the spindle 20 is mounted to a crank and an opposite end forms an externally-threaded section 21 for being tightened by a nut 35, whereby the nut 35 provides a tightening force that securely fixes the sleeves 31, the outer tube 32, the bearings 33, and the spindle 20 together to allow the pedal frame 10 to freely rotate about the spindle 20 for pedaling operation of the bicycle.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A method for making a bicycle pedal, characterized by comprising the following steps:
   (A) cutting, in which a rolled metal tube or an aluminum extruded tube is selected and cut to form a hollow pedal frame;
   (B) drilling, in which the pedal frame is machined to form penetrating coupling holes;
   (C) welding, in which a collar is mounted outside the pedal frame concentric with respect to each of the coupling holes through welding to provide a sufficient contact area in which a spindle is rotatably received and supported, whereby the pedal frame is rotatable about the spindle for pedaling operation of a bicycle; and
   (D) performing assembling operation after step (C), wherein a plastic sleeve is set within a bore of each of the collars and an outer tube is set to bridge and connect between the two coupling holes with opposite ends of the outer tube constrained by the two sleeves, the outer tube and the sleeves forming respectively centrally penetrating bores so that the bores of the sleeves receive therein bearings and sealing ring with a spindle rotatably received in and extending through the bearings, wherein an end of the spindle is adapted to mount to a crank and an opposite end forms an externally-threaded section for being tightened by a nut, and the sleeve associated with the opposite end of the spindle is closed by a cap, whereby the nut provides a tightening force that securely fixes the sleeves, the outer tube, the bearings, and the spindle together to allow the pedal frame to be rotatable about the spindle.

* * * * *